(12) United States Patent
Zhang et al.

(10) Patent No.: US 10,346,740 B2
(45) Date of Patent: Jul. 9, 2019

(54) SYSTEMS AND METHODS INCORPORATING A NEURAL NETWORK AND A FORWARD PHYSICAL MODEL FOR SEMICONDUCTOR APPLICATIONS

(71) Applicant: KLA-Tencor Corporation, Milpitas, CA (US)

(72) Inventors: Jing Zhang, Santa Clara (CA); Kris Bhaskar, San Jose, CA (US)

(73) Assignee: KLA-Tencor Corp., Milpitas, CA (US)

( * ) Notice: Subject to any disclaimer, the term of this patent is extended or adjusted under 35 U.S.C. 154(b) by 51 days.

(21) Appl. No.: 15/609,009

(22) Filed: May 31, 2017

(65) Prior Publication Data

US 2017/0351952 A1 Dec. 7, 2017

Related U.S. Application Data

(60) Provisional application No. 62/344,214, filed on Jun. 1, 2016.

(51) Int. Cl.
*G06N 7/02* (2006.01)
*G06N 7/04* (2006.01)
(Continued)

(52) U.S. Cl.
CPC ............ *G06N 3/08* (2013.01); *G06K 9/6274* (2013.01); *G06N 3/04* (2013.01); *G06N 3/0454* (2013.01)

(58) Field of Classification Search
CPC .......... G06N 3/08; G06N 3/0454; G06N 3/04; G06K 9/6274
See application file for complete search history.

(56) References Cited

U.S. PATENT DOCUMENTS 5,711,843 A * 1/1998 Jahns .................... B24B 37/013
156/345.24
7,570,796 B2 8/2009 Zafar et al.
(Continued)

FOREIGN PATENT DOCUMENTS

WO 2009/129496 10/2009

OTHER PUBLICATIONS

Inverting Visual Representations with Convolutional Networks Alexey Dosovitskiy Thomas Brox University of Freiburg Freiburg im Breisgau, Germany (Year: 2016).*

(Continued)

*Primary Examiner* — Scott A. Waldron
*Assistant Examiner* — Ababacar Seck
(74) *Attorney, Agent, or Firm* — Ann Marie Mewherter

(57) ABSTRACT

Methods and systems for training a neural network are provided. One system includes one or more components executed by one or more computer subsystems. The one or more components include a neural network configured for determining inverted features of input images in a training set for a specimen input to the neural network, a forward physical model configured for reconstructing the input images from the inverted features thereby generating a set of output images corresponding to the input images in the training set, and a residue layer configured for determining differences between the input images in the training set and their corresponding output images in the set. The one or more computer subsystems are configured for altering one or more parameters of the neural network based on the determined differences thereby training the neural network.

30 Claims, 5 Drawing Sheets

(51) Int. Cl.
*G06N 7/06* (2006.01)
*G06N 7/08* (2006.01)
*G06N 3/08* (2006.01)
*G06N 3/04* (2006.01)
*G06K 9/62* (2006.01)

(56) References Cited

U.S. PATENT DOCUMENTS

| | | | |
|---|---|---|---|
| 7,676,077 | B2 | 3/2010 | Kulkarni et al. |
| 8,126,255 | B2 | 2/2012 | Bhaskar et al. |
| 8,664,594 | B1 | 4/2014 | Jiang et al. |
| 8,692,204 | B2 | 4/2014 | Kojima et al. |
| 8,698,093 | B1 | 4/2014 | Gubbens et al. |
| 8,716,662 | B1 | 5/2014 | MacDonald et al. |
| 9,222,895 | B2 | 12/2015 | Duffy et al. |
| 2003/0062339 | A1* | 4/2003 | Houge ............... H01J 37/32935 216/84 |
| 2003/0086081 | A1 | 5/2003 | Lehman |
| 2003/0158679 | A1* | 8/2003 | Fukushima ........... G06T 7/0004 702/81 |
| 2005/0089215 | A1 | 4/2005 | Staelin et al. |
| 2006/0291714 | A1* | 12/2006 | Wu .................. G01N 21/95607 382/149 |
| 2009/0238432 | A1 | 9/2009 | Can et al. |
| 2010/0183217 | A1* | 7/2010 | Seung .................... G06K 9/342 382/156 |
| 2013/0114868 | A1* | 5/2013 | Burlina ................ A61B 5/0075 382/128 |
| 2014/0032463 | A1 | 1/2014 | Jin et al. |
| 2014/0376801 | A1* | 12/2014 | Karsenti ................ G06T 7/001 382/145 |
| 2016/0116420 | A1 | 4/2016 | Duffy et al. |
| 2016/0372303 | A1 | 12/2016 | Park et al. |
| 2016/0377425 | A1 | 12/2016 | Gupta et al. |
| 2017/0191945 | A1 | 7/2017 | Zhang et al. |
| 2017/0365038 | A1* | 12/2017 | Denton ..................... G06T 5/00 |
| 2017/0372155 | A1* | 12/2017 | Odry ........................ G06K 9/03 |

OTHER PUBLICATIONS

Model Based Image Processing Charles A. Bouman Purdue University (Year: 2013).*
Model-based machine learning Christopher M. Bishop Microsoft Research, Cambridge CB3 0Fb, UK (Year: 2013).*
Goodfellow et al., "Generative Adversarial Nets," arXiv:1406.2661, Jun. 10, 2014, 9 pages.
Hand et al., "Principles of Data Mining (Adaptive Computation and Machine Learning)," MIT Press, Aug. 1, 2001, 578 pages.
He et al., "Deep Residual Learning for Image Recognition," arXiv:1512.03385v1, Dec. 10, 2015, 12 pages.
International Search Report and Written Opinion for PCT/US2017/035494 dated Aug. 30, 2017.
Jebara, "Discriminative, Generative, and Imitative Learning," MIT Thesis, Feb. 2002, 212 pages.
Makhzani et al., "Adversarial Autoencoders," arXiv:1511.05644v2, May 25, 2016, 16 pages.
Mirza et al., "Conditional Generative Adversarial Nets," arXiv:1411.1784, Nov. 6, 2014, 7 pages.
Sugiyama, "Introduction to Statistical Machine Learning," Morgan Kaufmann, Oct. 9, 2015, 534 pages.
U.S. Appl. No. 15/176,139 by Zhang et al. filed Jun. 7, 2016 (submitted as U.S. Patent Application Publication No. 2017/0148226 published May 25, 2017).
U.S. Appl. No. 15/353,210 by Karsenti et al. filed Nov. 16, 2016 (submitted as U.S. Patent Application Publication No. 2017/0140524 published May 18, 2017).
U.S. Appl. No. 15/394,790 by Bhaskar et al. filed Dec. 29, 2016 (submitted as U.S. Patent Application Publication No. 2017/0193400 published Jul. 6, 2017).
U.S. Appl. No. 15/394,792 by Bhaskar et al. filed Dec. 29, 2016 (submitted as U.S. Patent Application Publication No. 2017/0194126 published Jul. 6, 2017).
U.S. Appl. No. 15/396,800 by Zhang et al. filed Jan. 2, 2017 (submitted as U.S. Patent Application Publication No. 2017/0193680 published Jul. 6, 2017).
U.S. Appl. No. 15/402,094 by Bhaskar et al. filed Jan. 9, 2017 (submitted as U.S. Patent Application Publication No. 2017/0200265 published Jul. 13, 2017).
U.S. Appl. No. 15/402,169 by Bhaskar et al. filed Jan. 9, 2017 (submitted as U.S. Patent Application Publication No. 2017/0200260 published Jul. 13, 2017).
U.S. Appl. No. 15/402,197 by Park et al. filed Jan. 9, 2017 (submitted as U.S. Patent Application Publication No. 2017/0200264 published Jul. 13, 2017).
U.S. Appl. No. 15/603,249 by Zhang et al. filed May 23, 2017 (submitted as U.S. Patent Application Publication No. 2017/0345140 published Nov. 30, 2017).

* cited by examiner

SYSTEMS AND METHODS INCORPORATING A NEURAL NETWORK AND A FORWARD PHYSICAL MODEL FOR SEMICONDUCTOR APPLICATIONS

BACKGROUND OF THE INVENTION

1. Field of the Invention

The present invention generally relates to methods and systems incorporating a neural network and a forward physical model for semiconductor applications.

2. Description of the Related Art

The following description and examples are not admitted to be prior art by virtue of their inclusion in this section.

Fabricating semiconductor devices such as logic and memory devices typically includes processing a substrate such as a semiconductor wafer using a large number of semiconductor fabrication processes to form various features and multiple levels of the semiconductor devices. For example, lithography is a semiconductor fabrication process that involves transferring a pattern from a reticle to a resist arranged on a semiconductor wafer. Additional examples of semiconductor fabrication processes include, but are not limited to, chemical-mechanical polishing (CMP), etch, deposition, and ion implantation. Multiple semiconductor devices may be fabricated in an arrangement on a single semiconductor wafer and then separated into individual semiconductor devices.

Inspection processes are used at various steps during a semiconductor manufacturing process to detect defects on specimens to drive higher yield in the manufacturing process and thus higher profits. Inspection has always been an important part of fabricating semiconductor devices. However, as the dimensions of semiconductor devices decrease, inspection becomes even more important to the successful manufacture of acceptable semiconductor devices because smaller defects can cause the devices to fail.

Defect review typically involves re-detecting defects detected as such by an inspection process and generating additional information about the defects at a higher resolution using either a high magnification optical system or a scanning electron microscope (SEM). Defect review is therefore performed at discrete locations on specimens where defects have been detected by inspection. The higher resolution data for the defects generated by defect review is more suitable for determining attributes of the defects such as profile, roughness, more accurate size information, etc.

Metrology processes are also used at various steps during a semiconductor manufacturing process to monitor and control the process. Metrology processes are different than inspection processes in that, unlike inspection processes in which defects are detected on specimens, metrology processes are used to measure one or more characteristics of the specimens that cannot be determined using currently used inspection tools. For example, metrology processes are used to measure one or more characteristics of specimens such as a dimension (e.g., line width, thickness, etc.) of features formed on the specimens during a process such that the performance of the process can be determined from the one or more characteristics. In addition, if the one or more characteristics of the specimens are unacceptable (e.g., out of a predetermined range for the characteristic(s)), the measurements of the one or more characteristics of the specimens may be used to alter one or more parameters of the process such that additional specimens manufactured by the process have acceptable characteristic(s).

Metrology processes are also different than defect review processes in that, unlike defect review processes in which defects that are detected by inspection are re-visited in defect review, metrology processes may be performed at locations at which no defect has been detected. In other words, unlike defect review, the locations at which a metrology process is performed on specimens may be independent of the results of an inspection process performed on the specimens. In particular, the locations at which a metrology process is performed may be selected independently of inspection results.

As design rules shrink, the design that is formed on a specimen such as reticles and wafers, even when formed using an optimally performing process, can look much different from the actual design. For example, due to the inherent limitations of the physical processes involved in forming a design on a physical specimen, features in the design formed on the physical specimen typically have somewhat different characteristics than the design such as different shapes (e.g., due to corner rounding and other proximity effects) and can have somewhat different dimensions (e.g., due to proximity effects) even when the best possible version of the design has been formed on the specimen.

Sometimes, it is not possible to know how the design will appear on the specimen and in images of the specimen, on which the design information has been formed, generated by tools such as inspection tools, defect review tools, metrology tools and the like. However, it is often desirable to know how the design will appear on the specimen and in images generated by such tools for a number of reasons. One reason is to make sure that the design will be formed on the specimen in an acceptable manner. Another reason is to provide a reference for the design, which illustrates how the design is meant to be formed on the specimen, that can be used for one or more functions performed for the specimen. For example, in general, a reference is needed for defect detection so that any differences between the design formed on the specimen and the reference can be detected and identified as defects or potential defects.

Much work has therefore been done to develop various methods and systems that can simulate one image for a specimen from another image for the specimen. Conventional approaches in general involve two steps: (1) restoring or inversing the undesired optical effects (e.g., diffraction, interference, partial coherence, etc.); and (2) using the restored/processed imaging data as the input to train an application-specific neural network. Restoring or inversing the undesired optical effects can be performed through (a) either conventional image processing or signal processing algorithms (e.g., Lucy-Richardson deconvolution and regularized Lucy-Richardson deconvolution, Wiener filter, tool calibration, etc.); (b) first-principle optics simulation; or (c) supervised machine learning or deep learning algorithms, given that a training dataset can be obtained from tool measurements and/or through simulation.

There are, however, a number of disadvantages to the currently used methods. For example, currently used restoring/inversing algorithms (e.g., Lucy-Richardson deconvolution, Wiener filter) are often under-determinate and noise sensitive. In addition, the currently used restoring/inversing algorithms described above are computationally intensive (i.e., they are not suitable for real-time on-tool applications). The currently used restoring/inversing algorithms described above can also only be applied to algorithmically invertible optical parameters (e.g., it is still substantially difficult to perform phase retrieval on semiconductor optical images).

Furthermore, the currently used restoring/inversing algorithms described above require the exact (at least good) estimated optical parameters as inputs. Moreover, currently used supervised training algorithms for restoring described above require a training dataset of tuples of original collected images and their corresponding restored images, which is often impossible or substantially expensive to be measured or simulated. In addition, the two-step approach is inefficient from the mathematically optimization perspective.

Accordingly, it would be advantageous to develop systems and methods for training a neural network that do not have one or more of the disadvantages described above.

SUMMARY OF THE INVENTION

The following description of various embodiments is not to be construed in any way as limiting the subject matter of the appended claims.

One embodiment relates to a system configured to train a neural network. The system includes one or more computer subsystems and one or more components executed by the one or more computer subsystems. The one or more components include a neural network configured for determining inverted features of input images in a training set for a specimen input to the neural network. The one or more components also include a forward physical model configured for reconstructing the input images from the inverted features thereby generating a set of output images corresponding to the input images in the training set. In addition, the one or more components include a residue layer configured for determining differences between the input images in the training set and their corresponding output images in the set. The one or more computer subsystems are configured for altering one or more parameters of the neural network based on the determined differences thereby training the neural network. The system may be further configured as described herein.

An additional embodiment relates to another system configured to train a neural network. This system is configured as described above. This system also includes an imaging subsystem configured for generating images of a specimen. The computer subsystem(s) are, in this embodiment, configured for acquiring the images and generating a training set of input images from the acquired images. This embodiment of the system may be further configured as described herein.

Another embodiment relates to a computer-implemented method for training a neural network. The method includes determining inverted features of input images in a training set for a specimen by inputting the training set of input images to a neural network. The method also includes reconstructing the input images from the inverted features by inputting the inverted features into a forward physical model thereby generating a set of output images corresponding to the input images in the training set. In addition, the method includes determining differences between the input images in the training set and their corresponding output images in the set. The method further includes altering one or more parameters of the neural network based on the determined differences thereby training the neural network. Determining the inverted features, reconstructing the input images, determining the differences, and altering the one or more parameters are performed by one or more computer systems. One or more components are executed by the one or more computer systems, and the one or more components include the neural network and the forward physical model.

Each of the steps of the method described above may be further performed as described further herein. In addition, the embodiment of the method described above may include any other step(s) of any other method(s) described herein. Furthermore, the method described above may be performed by any of the systems described herein.

Another embodiment relates to a non-transitory computer-readable medium storing program instructions executable on one or more computer systems for performing a computer-implemented method for training a neural network. The computer-implemented method includes the steps of the method described above. The computer-readable medium may be further configured as described herein. The steps of the computer-implemented method may be performed as described further herein. In addition, the computer-implemented method for which the program instructions are executable may include any other step(s) of any other method(s) described herein.

BRIEF DESCRIPTION OF THE DRAWINGS

Further advantages of the present invention will become apparent to those skilled in the art with the benefit of the following detailed description of the preferred embodiments and upon reference to the accompanying drawings in which.

Figure 1:
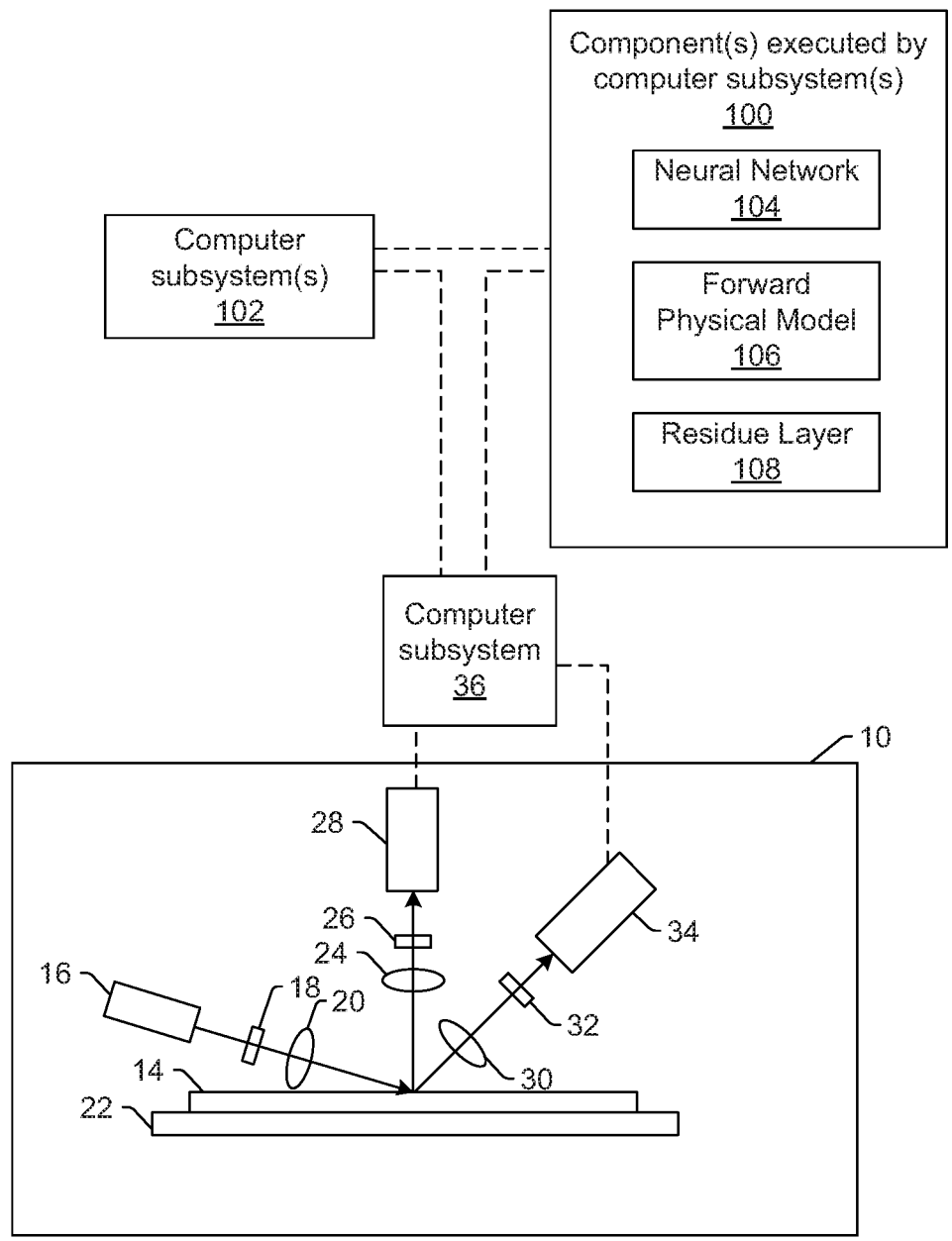
FIGS. 1 and 1*a* are schematic diagrams illustrating side views of embodiments of a system configured as described herein.

While the invention is susceptible to various modifications and alternative forms, specific embodiments thereof are shown by way of example in the drawings and are herein described in detail. The drawings may not be to scale. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

The terms "design," "design data," and "design information" as used interchangeably herein generally refer to the physical design (layout) of an IC and data derived from the physical design through complex simulation or simple geometric and Boolean operations. In addition, an image of a reticle acquired by a reticle inspection system and/or derivatives thereof can be used as a "proxy" or "proxies" for the design. Such a reticle image or a derivative thereof can serve as a substitute for the design layout in any embodiments described herein that use a design. The design may include any other design data or design data proxies described in commonly owned U.S. Pat. No. 7,570,796 issued on Aug. 4, 2009 to Zafar et al. and U.S. Pat. No. 7,676,077 issued on Mar. 9, 2010 to Kulkarni et al., both of which are incorporated by reference as if fully set forth herein. In addition, the design data can be standard cell library data, integrated layout data, design data for one or more layers, derivatives of the design data, and full or partial chip design data.

In addition, the "design," "design data," and "design information" described herein refers to information and data that is generated by semiconductor device designers in a design process and is therefore available for use in the embodiments described herein well in advance of printing of the design on any physical specimens such as reticles and wafers.

Turning now to the drawings, it is noted that the figures are not drawn to scale. In particular, the scale of some of the elements of the figures is greatly exaggerated to emphasize characteristics of the elements. It is also noted that the figures are not drawn to the same scale. Elements shown in more than one figure that may be similarly configured have been indicated using the same reference numerals. Unless otherwise noted herein, any of the elements described and shown may include any suitable commercially available elements.

One embodiment relates to a system configured to train a neural network. As described further herein, the embodiments may include an inversion neural network (INN) to solve the inverse problem for semiconductor applications such as inspection, defect review, metrology, and others described herein. In addition, as described further herein, the embodiments may provide a generic and systematic approach to incorporate a differentiable forward physical model into a trainable neural network to solve the conventional difficult inverse problem for semiconductor inspection, metrology, review, and quality assurance (QA) applications on optical, electron beam, and ion beam tools.

One embodiment of a system configured to train a neural network is shown in FIG. 1. The system includes one or more computer subsystems (e.g., computer subsystem 36 and computer subsystem(s) 102) and one or more components 100 executed by the one or more computer subsystems. In some embodiments, the system includes imaging system (or subsystem) 10. In the embodiment of FIG. 1, the imaging system is configured for scanning light over or directing light to a physical version of the specimen while detecting light from the specimen to thereby generate the images for the specimen. The imaging system may also be configured to perform the scanning (or directing) and the detecting with multiple modes.

In one embodiment, the specimen is a wafer. The wafer may include any wafer known in the art. In another embodiment, the specimen is a reticle. The reticle may include any reticle known in the art.

In one embodiment, the imaging system is an optical based imaging system. In this manner, in some embodiments, the input images are generated by an optical based imaging system. In one such example, in the embodiment of the system shown in FIG. 1, optical based imaging system 10 includes an illumination subsystem configured to direct light to specimen 14. The illumination subsystem includes at least one light source. For example, as shown in FIG. 1, the illumination subsystem includes light source 16. In one embodiment, the illumination subsystem is configured to direct the light to the specimen at one or more angles of incidence, which may include one or more oblique angles and/or one or more normal angles. For example, as shown in FIG. 1, light from light source 16 is directed through optical element 18 and then lens 20 to specimen 14 at an oblique angle of incidence. The oblique angle of incidence may include any suitable oblique angle of incidence, which may vary depending on, for instance, characteristics of the specimen.

The imaging system may be configured to direct the light to the specimen at different angles of incidence at different times. For example, the imaging system may be configured to alter one or more characteristics of one or more elements of the illumination subsystem such that the light can be directed to the specimen at an angle of incidence that is different than that shown in FIG. 1. In one such example, the imaging system may be configured to move light source 16, optical element 18, and lens 20 such that the light is directed to the specimen at a different oblique angle of incidence or a normal (or near normal) angle of incidence.

In some instances, the imaging system may be configured to direct light to the specimen at more than one angle of incidence at the same time. For example, the illumination subsystem may include more than one illumination channel, one of the illumination channels may include light source 16, optical element 18, and lens 20 as shown in FIG. 1 and another of the illumination channels (not shown) may include similar elements, which may be configured differently or the same, or may include at least a light source and possibly one or more other components such as those described further herein. If such light is directed to the specimen at the same time as the other light, one or more characteristics (e.g., wavelength, polarization, etc.) of the light directed to the specimen at different angles of incidence may be different such that light resulting from illumination of the specimen at the different angles of incidence can be discriminated from each other at the detector(s).

In another instance, the illumination subsystem may include only one light source (e.g., source 16 shown in FIG. 1) and light from the light source may be separated into different optical paths (e.g., based on wavelength, polarization, etc.) by one or more optical elements (not shown) of the illumination subsystem. Light in each of the different optical paths may then be directed to the specimen. Multiple illumination channels may be configured to direct light to the specimen at the same time or at different times (e.g., when different illumination channels are used to sequentially illuminate the specimen). In another instance, the same illumination channel may be configured to direct light to the specimen with different characteristics at different times. For example, in some instances, optical element 18 may be configured as a spectral filter and the properties of the spectral filter can be changed in a variety of different ways (e.g., by swapping out the spectral filter) such that different wavelengths of light can be directed to the specimen at different times. The illumination subsystem may have any other suitable configuration known in the art for directing the light having different or the same characteristics to the specimen at different or the same angles of incidence sequentially or simultaneously.

In one embodiment, light source 16 may include a broadband plasma (BBP) light source. In this manner, the light generated by the light source and directed to the specimen may include broadband light. However, the light source may include any other suitable light source such as a laser. The laser may include any suitable laser known in the art and may be configured to generate light at any suitable wavelength or wavelengths known in the art. In addition, the laser may be configured to generate light that is monochromatic or nearly-monochromatic. In this manner, the laser may be a narrowband laser. The light source may also include a polychromatic light source that generates light at multiple discrete wavelengths or wavebands.

Light from optical element 18 may be focused onto specimen 14 by lens 20. Although lens 20 is shown in FIG. 1 as a single refractive optical element, it is to be understood that, in practice, lens 20 may include a number of refractive and/or reflective optical elements that in combination focus the light from the optical element to the specimen. The illumination subsystem shown in FIG. 1 and described herein may include any other suitable optical elements (not shown). Examples of such optical elements include, but are not limited to, polarizing component(s), spectral filter(s), spatial filter(s), reflective optical element(s), apodizer(s), beam splitter(s), aperture(s), and the like, which may include any such suitable optical elements known in the art. In addition, the imaging system may be configured to alter one or more of the elements of the illumination subsystem based on the type of illumination to be used for imaging.

The imaging system may also include a scanning subsystem configured to cause the light to be scanned over the specimen. For example, the imaging system may include stage 22 on which specimen 14 is disposed during inspection. The scanning subsystem may include any suitable mechanical and/or robotic assembly (that includes stage 22) that can be configured to move the specimen such that the light can be scanned over the specimen. In addition, or alternatively, the imaging system may be configured such that one or more optical elements of the imaging system perform some scanning of the light over the specimen. The light may be scanned over the specimen in any suitable fashion such as in a serpentine-like path or in a spiral path.

The imaging system further includes one or more detection channels. At least one of the one or more detection channels includes a detector configured to detect light from the specimen due to illumination of the specimen by the system and to generate output responsive to the detected light. For example, the imaging system shown in FIG. 1 includes two detection channels, one formed by collector 24, element 26, and detector 28 and another formed by collector 30, element 32, and detector 34. As shown in FIG. 1, the two detection channels are configured to collect and detect light at different angles of collection. In some instances, both detection channels are configured to detect scattered light, and the detection channels are configured to detect light that is scattered at different angles from the specimen. However, one or more of the detection channels may be configured to detect another type of light from the specimen (e.g., reflected light).

As further shown in FIG. 1, both detection channels are shown positioned in the plane of the paper and the illumination subsystem is also shown positioned in the plane of the paper. Therefore, in this embodiment, both detection channels are positioned in (e.g., centered in) the plane of incidence. However, one or more of the detection channels may be positioned out of the plane of incidence. For example, the detection channel formed by collector 30, element 32, and detector 34 may be configured to collect and detect light that is scattered out of the plane of incidence. Therefore, such a detection channel may be commonly referred to as a "side" channel, and such a side channel may be centered in a plane that is substantially perpendicular to the plane of incidence.

Although FIG. 1 shows an embodiment of the imaging system that includes two detection channels, the imaging system may include a different number of detection channels (e.g., only one detection channel or two or more detection channels). In one such instance, the detection channel formed by collector 30, element 32, and detector 34 may form one side channel as described above, and the imaging system may include an additional detection channel (not shown) formed as another side channel that is positioned on the opposite side of the plane of incidence. Therefore, the imaging system may include the detection channel that includes collector 24, element 26, and detector 28 and that is centered in the plane of incidence and configured to collect and detect light at scattering angle(s) that are at or close to normal to the specimen surface. This detection channel may therefore be commonly referred to as a "top" channel, and the imaging system may also include two or more side channels configured as described above. As such, the imaging system may include at least three channels (i.e., one top channel and two side channels), and each of the at least three channels has its own collector, each of which is configured to collect light at different scattering angles than each of the other collectors.

As described further above, each of the detection channels included in the imaging system may be configured to detect scattered light. Therefore, the imaging system shown in FIG. 1 may be configured for dark field (DF) imaging of specimens. However, the imaging system may also or alternatively include detection channel(s) that are configured for bright field (BF) imaging of specimens. In other words, the imaging system may include at least one detection channel that is configured to detect light specularly reflected from the specimen. Therefore, the imaging systems described herein may be configured for only DF, only BF, or both DF and BF imaging. Although each of the collectors are shown in FIG. 1 as single refractive optical elements, it is to be understood that each of the collectors may include one or more refractive optical element(s) and/or one or more reflective optical element(s).

The one or more detection channels may include any suitable detectors known in the art. For example, the detectors may include photo-multiplier tubes (PMTs), charge coupled devices (CCDs), time delay integration (TDI) cameras, and any other suitable detectors known in the art. The detectors may also include non-imaging detectors or imaging detectors. In this manner, if the detectors are non-imaging detectors, each of the detectors may be configured to detect certain characteristics of the scattered light such as intensity but may not be configured to detect such characteristics as a function of position within the imaging plane. As such, the output that is generated by each of the detectors included in each of the detection channels of the imaging system may be signals or data, but not image signals or image data. In such instances, a computer subsystem such as computer subsystem 36 may be configured to generate images of the specimen from the non-imaging output of the detectors. However, in other instances, the detectors may be configured as imaging detectors that are configured to generate image signals or image data. Therefore, the imaging system may be configured to generate the images described herein in a number of ways.

It is noted that FIG. 1 is provided herein to generally illustrate a configuration of an imaging system or subsystem that may be included in the system embodiments described herein or that may generate images that are used by the system embodiments described herein. Obviously, the imaging system configuration described herein may be altered to optimize the performance of the imaging system as is normally performed when designing a commercial imaging system. In addition, the systems described herein may be implemented using an existing system (e.g., by adding functionality described herein to an existing system) such as the 29xx/39xx and Puma 9xxx series of tools that are commercially available from KLA-Tencor, Milpitas, Calif. For some such systems, the embodiments described herein may be provided as optional functionality of the system (e.g., in addition to other functionality of the system).

Alternatively, the imaging system described herein may be designed "from scratch" to provide a completely new imaging system.

Computer subsystem 36 of the imaging system may be coupled to the detectors of the imaging system in any suitable manner (e.g., via one or more transmission media, which may include "wired" and/or "wireless" transmission media) such that the computer subsystem can receive the output generated by the detectors during scanning of the specimen. Computer subsystem 36 may be configured to perform a number of functions described further herein using the output of the detectors.

The computer subsystems shown in FIG. 1 (as well as other computer subsystems described herein) may also be referred to herein as computer system(s). Each of the computer subsystem(s) or system(s) described herein may take various forms, including a personal computer system, image computer, mainframe computer system, workstation, network appliance, Internet appliance, or other device. In general, the term "computer system" may be broadly defined to encompass any device having one or more processors, which executes instructions from a memory medium. The computer subsystem(s) or system(s) may also include any suitable processor known in the art such as a parallel processor. In addition, the computer subsystem(s) or system(s) may include a computer platform with high speed processing and software, either as a standalone or a networked tool.

If the system includes more than one computer subsystem, then the different computer subsystems may be coupled to each other such that images, data, information, instructions, etc. can be sent between the computer subsystems as described further herein. For example, computer subsystem 36 may be coupled to computer subsystem(s) 102 as shown by the dashed line in FIG. 1 by any suitable transmission media, which may include any suitable wired and/or wireless transmission media known in the art. Two or more of such computer subsystems may also be effectively coupled by a shared computer-readable storage medium (not shown).

Figure 1A:
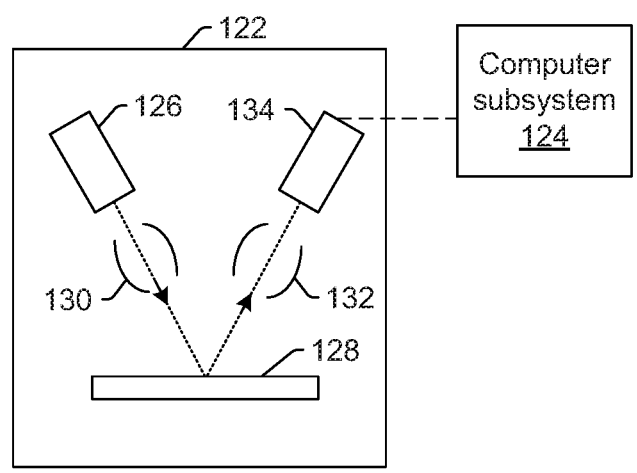

Although the imaging system is described above as being an optical or light-based imaging system, the imaging system may be an electron beam based imaging system. In this manner, in some embodiments, the input images are generated by an electron beam based imaging system. In one such embodiment shown in FIG. 1a, the imaging system includes electron column 122 coupled to computer subsystem 124. As also shown in FIG. 1a, the electron column includes electron beam source 126 configured to generate electrons that are focused to specimen 128 by one or more elements 130. The electron beam source may include, for example, a cathode source or emitter tip, and one or more elements 130 may include, for example, a gun lens, an anode, a beam limiting aperture, a gate valve, a beam current selection aperture, an objective lens, and a scanning subsystem, all of which may include any such suitable elements known in the art.

Electrons returned from the specimen (e.g., secondary electrons) may be focused by one or more elements 132 to detector 134. One or more elements 132 may include, for example, a scanning subsystem, which may be the same scanning subsystem included in element(s) 130.

The electron column may include any other suitable elements known in the art. In addition, the electron column may be further configured as described in U.S. Pat. No. 8,664,594 issued Apr. 4, 2014 to Jiang et al., U.S. Pat. No. 8,692,204 issued Apr. 8, 2014 to Kojima et al., U.S. Pat. No. 8,698,093 issued Apr. 15, 2014 to Gubbens et al., and U.S. Pat. No. 8,716,662 issued May 6, 2014 to MacDonald et al., which are incorporated by reference as if fully set forth herein.

Although the electron column is shown in FIG. 1a as being configured such that the electrons are directed to the specimen at an oblique angle of incidence and are scattered from the specimen at another oblique angle, it is to be understood that the electron beam may be directed to and scattered from the specimen at any suitable angles. In addition, the electron beam based imaging system may be configured to use multiple modes to generate images of the specimen as described further herein (e.g., with different illumination angles, collection angles, etc.). The multiple modes of the electron beam based imaging system may be different in any image generation parameters of the imaging system.

Computer subsystem 124 may be coupled to detector 134 as described above. The detector may detect electrons returned from the surface of the specimen thereby forming electron beam images of the specimen. The electron beam images may include any suitable electron beam images. Computer subsystem 124 may be configured to perform one or more functions described further herein for the specimen using output generated by detector 134. Computer subsystem 124 may be configured to perform any additional step(s) described herein. A system that includes the imaging system shown in FIG. 1a may be further configured as described herein.

It is noted that FIG. 1a is provided herein to generally illustrate a configuration of an electron beam based imaging system that may be included in the embodiments described herein. As with the optical based imaging system described above, the electron beam based imaging system configuration described herein may be altered to optimize the performance of the imaging system as is normally performed when designing a commercial imaging system. In addition, the systems described herein may be implemented using an existing system (e.g., by adding functionality described herein to an existing system) such as the eSxxx and eDR-xxxx series of tools that are commercially available from KLA-Tencor. For some such systems, the embodiments described herein may be provided as optional functionality of the system (e.g., in addition to other functionality of the system). Alternatively, the system described herein may be designed "from scratch" to provide a completely new system.

Although the imaging system is described above as being an optical based or electron beam based imaging system, the imaging system may be an ion beam based imaging system. Such an imaging system may be configured as shown in FIG. 1a except that the electron beam source may be replaced with any suitable ion beam source known in the art. In addition, the imaging system may be any other suitable ion beam based imaging system such as those included in commercially available focused ion beam (FIB) systems, helium ion microscopy (HIM) systems, and secondary ion mass spectroscopy (SIMS) systems.

As noted above, the imaging system is configured for scanning energy (e.g., light or electrons) over a physical version of the specimen thereby generating actual images for the physical version of the specimen. In this manner, the imaging system may be configured as an "actual" system, rather than a "virtual" system. For example, a storage medium (not shown) and computer subsystem(s) 102 shown in FIG. 1 may be configured as a "virtual" system. In particular, the storage medium and the computer subsystem(s) are not part of imaging system 10 and do not have any capability for handling the physical version of the specimen. In other words, in systems configured as virtual systems, the output of its one or more "detectors" may be output that was previously generated by one or more detectors of an actual system and that is stored in the virtual system, and during the "scanning," the virtual system may replay the stored output as though the specimen is being scanned. In this manner, scanning the specimen with a virtual system may appear to be the same as though a physical specimen is being scanned with an actual system, while, in reality, the "scanning" involves simply replaying output for the specimen in the same manner as the specimen may be scanned. Systems and methods configured as "virtual" inspection systems are described in commonly assigned U.S. Pat. No. 8,126,255 issued on Feb. 28, 2012 to Bhaskar et al. and U.S. Pat. No. 9,222,895 issued on Dec. 29, 2015 to Duffy et al., both of which are incorporated by reference as if fully set forth herein. The embodiments described herein may be further configured as described in these patents. For example, the one or more computer subsystems described herein may be further configured as described in these patents. In addition, configuring the one or more virtual systems as a central compute and storage (CCS) system may be performed as described in the above-referenced patent to Duffy. The persistent storage mechanisms described herein can have distributed computing and storage such as the CCS architecture, but the embodiments described herein are not limited to that architecture.

As further noted above, the imaging system may be configured to generate images of the specimen with multiple modes. In general, a "mode" can be defined by the values of parameters of the imaging system used for generating images of a specimen or the output used to generate images of the specimen. Therefore, modes that are different may be different in the values for at least one of the imaging parameters of the imaging system. For example, in one embodiment of an optical based imaging system, at least one of the multiple modes uses at least one wavelength of light for illumination that is different from at least one wavelength of the light for illumination used for at least one other of the multiple modes. The modes may be different in the illumination wavelength as described further herein (e.g., by using different light sources, different spectral filters, etc.) for different modes. In another embodiment, at least one of the multiple modes uses an illumination channel of the imaging system that is different from an illumination channel of the imaging system used for at least one other of the multiple modes. For example, as noted above, the imaging system may include more than one illumination channel. As such, different illumination channels may be used for different modes.

In one embodiment, the input images are generated by an inspection system. For example, the optical and electron beam imaging systems described herein may be configured as inspection systems. In this manner, the image inputs to the neural network are generated by an inspection system in some embodiments. In another embodiment, the imaging system is a defect review system. For example, the optical and electron beam imaging systems described herein may be configured as defect review systems. In a further embodiment, the imaging system is a metrology system. For example, the optical and electron beam imaging systems described herein may be configured as metrology systems. In this manner, the input images are generated by a metrology system in some embodiments. In particular, the embodiments of the imaging systems described herein and shown in FIGS. 1 and 1a may be modified in one or more parameters to provide different imaging capability depending on the application for which they will be used. In one such example, the imaging system shown in FIG. 1 may be configured to have a higher resolution if it is to be used for defect review or metrology rather than for inspection. In other words, the embodiments of the imaging system shown in FIGS. 1 and 1a describe some general and various configurations for an imaging system that can be tailored in a number of manners that will be obvious to one skilled in the art to produce imaging systems having different imaging capabilities that are more or less suitable for different applications.

The one or more computer subsystems may be configured for acquiring the image for the specimen generated by an imaging subsystem described herein. Acquiring the image may be performed using one of the imaging systems described herein (e.g., by directing light or an electron beam to the specimen and detecting light or an electron beam from the specimen). In this manner, acquiring the image may be performed using the physical specimen itself and some sort of imaging hardware. However, acquiring the image does not necessarily include imaging the specimen using imaging hardware. For example, another system and/or method may generate the image and may store the generated image in one or more storage media such as a virtual inspection system as described herein or another storage media described herein. Therefore, acquiring the image may include acquiring the image from the storage media in which it has been stored.

Figure 2:
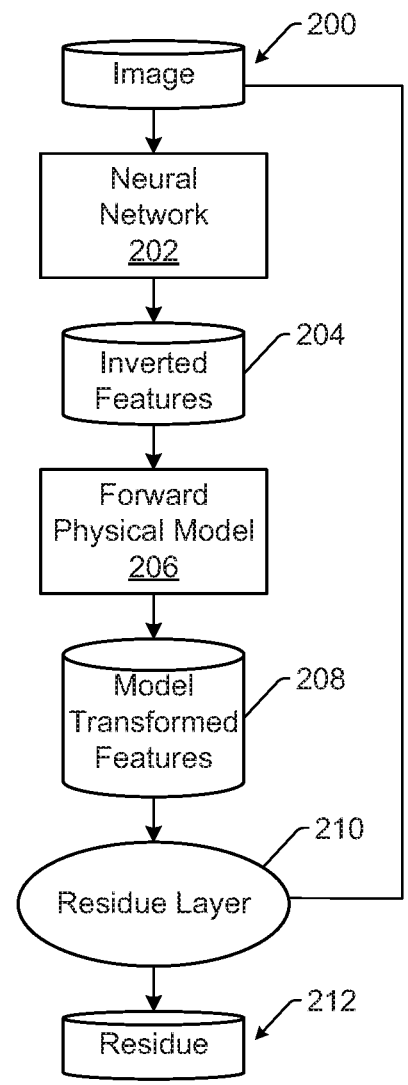
FIG. 2 is a flow chart illustrating one embodiment of training a neural network.

The component(s), e.g., component(s) 100 shown in FIG. 1, executed by the computer subsystem(s), e.g., computer subsystem 36 and/or computer subsystem(s) 102, include neural network 104. The neural network is configured for determining inverted features of input images in a training set for a specimen input to the neural network. For example, as shown in FIG. 2, image 200 may be input to neural network 202, which determines inverted features 204 for the image. In this manner, a neural network is used to approximate the inversion function $f^{-1}(\ )$, and the neural network generates the inverted features from the input image. In the context of semiconductor applications such as inspection, metrology, and defect review, the neural network described herein can be used to solve inverse problems in imaging formation (e.g., diffraction, interference, partial coherence, blurring, etc.) to regenerate optically-corrected features. "Inverted features" (where inverted is related to the context of an inversion neural network) are generally defined herein as features after inverting a physical process and "features" are defined as generally referring to measurable properties including, but not limited to, intensity, amplitude, phase, edge, gradients, etc.

In general, the neural network does not have to be defined by a unique topology to implement the functions described herein. Instead, the neural network may be application specific, and its layer type and number of layers are undefined. The neural network may include two or more encoder layers configured for determining the inverted features of an image for a specimen. The term "encoder" generally refers to a neural network or part of a neural network that "encodes" the information content of input data to a more compact representation. The encode process may be effectively lossy or lossless. In addition, the encode process may or may not be human interpretable. The encoded representation can be a vector of scalar values or distributions.

In one embodiment, the neural network is a deep learning model. Generally speaking, "deep learning" (also known as deep structured learning, hierarchical learning or deep machine learning) is a branch of machine learning based on a set of algorithms that attempt to model high level abstractions in data. In a simple case, there may be two sets of neurons: ones that receive an input signal and ones that send an output signal. When the input layer receives an input, it passes on a modified version of the input to the next layer. In a deep network, there are many layers between the input and output (and the layers are not made of neurons but it can help to think of it that way), allowing the algorithm to use multiple processing layers, composed of multiple linear and non-linear transformations.

Deep learning is part of a broader family of machine learning methods based on learning representations of data. An observation (e.g., an image) can be represented in many ways such as a vector of intensity values per pixel, or in a more abstract way as a set of edges, regions of particular shape, etc. Some representations are better than others at simplifying the learning task (e.g., face recognition or facial expression recognition). One of the promises of deep learning is replacing handcrafted features with efficient algorithms for unsupervised or semi-supervised feature learning and hierarchical feature extraction.

Research in this area attempts to make better representations and create models to learn these representations from large-scale unlabeled data. Some of the representations are inspired by advances in neuroscience and are loosely based on interpretation of information processing and communication patterns in a nervous system, such as neural coding which attempts to define a relationship between various stimuli and associated neuronal responses in the brain.

Various deep learning architectures such as deep neural networks, convolutional deep neural networks, deep belief networks and recurrent neural networks have been applied to fields like computer vision, automatic speech recognition, natural language processing, audio recognition and bioinformatics where they have been shown to produce state-of-the-art results on various tasks.

In another embodiment, the neural network is a machine learning model. Machine learning can be generally defined as a type of artificial intelligence (AI) that provides computers with the ability to learn without being explicitly programmed. Machine learning focuses on the development of computer programs that can teach themselves to grow and change when exposed to new data. In other words, machine learning can be defined as the subfield of computer science that "gives computers the ability to learn without being explicitly programmed." Machine learning explores the study and construction of algorithms that can learn from and make predictions on data—such algorithms overcome following strictly static program instructions by making data driven predictions or decisions, through building a model from sample inputs.

The machine learning described herein may be further performed as described in "Introduction to Statistical Machine Learning," by Sugiyama, Morgan Kaufmann, 2016, 534 pages; "Discriminative, Generative, and Imitative Learning," Jebara, MIT Thesis, 2002, 212 pages; and "Principles of Data Mining (Adaptive Computation and Machine Learning)," Hand et al., MIT Press, 2001, 578 pages; which are incorporated by reference as if fully set forth herein. The embodiments described herein may be further configured as described in these references.

In some embodiments, the neural network is a generative model. A "generative" model can be generally defined as a model that is probabilistic in nature. In other words, a "generative" model is not one that performs forward simulation or rule-based approaches and, as such, a model of the physics of the processes involved in generating an actual image (for which a simulated image is being generated) is not necessary. Instead, as described further herein, the generative model can be learned (in that its parameters can be learned) based on a suitable training set of data.

In one embodiment, the neural network is configured as a deep generative model. For example, the model may be configured to have a deep learning architecture in that the model may include multiple layers, which perform a number of algorithms or transformations. The number of layers on the encoder side of the generative model is use case dependent. For practical purposes, a suitable range of layers on the encoder side is from 2 layers to a few tens of layers.

In a further embodiment, the neural network may be a deep neural network with a set of weights that model the world according to the data that it has been fed to train it. Neural networks can be generally defined as a computational approach which is based on a relatively large collection of neural units loosely modeling the way a biological brain solves problems with relatively large clusters of biological neurons connected by axons. Each neural unit is connected with many others, and links can be enforcing or inhibitory in their effect on the activation state of connected neural units. These systems are self-learning and trained rather than explicitly programmed and excel in areas where the solution or feature detection is difficult to express in a traditional computer program.

Neural networks typically consist of multiple layers, and the signal path traverses from front to back. The goal of the neural network is to solve problems in the same way that the human brain would, although several neural networks are much more abstract. Modern neural network projects typically work with a few thousand to a few million neural units and millions of connections. The neural network may have any suitable architecture and/or configuration known in the art.

In another embodiment, the neural network is configured as a convolution neural network (CNN). For example, the neural network may be configured as a CNN, which is usually stacks of convolution and pooling layers, to extract local features. The embodiments described herein can take advantage of deep learning concepts such as a CNN to solve the normally intractable representation inversion problem. The model may have any CNN configuration or architecture known in the art. In another embodiment, the neural network is configured as a fully convolutional model. In additional embodiments, the neural network may be configured as a deep generative model, a CNN, a generative adversarial net (GAN), a conditional generative adversarial net (cGAN), a GAN and a variational autoencoder (VAE), and a network that contains a CNN as a part (i.e., a part of the neural network is configured as a CNN), all of which can be configured as described herein.

A GAN included in the embodiments described herein may be configured as described in "Generative Adversarial Nets," Goodfellow et al., arXiv: 1406.2661, Jun. 10, 2014, 9 pages, which is incorporated by reference as if fully set forth herein. Goodfellow et al. describe a new framework for estimating generative models via an adversarial process, in which two models are simultaneously trained: a generative model G that captures the data distribution, and a discriminative model D that estimates the probability that a sample came from the training data rather than G. The training procedure for G is to maximize the probability of D making a mistake. This framework corresponds to a minimax two-player game. In the space of arbitrary functions G and D, a unique solution exists, with G recovering the training data distribution and D equal to ½ everywhere. In the case where G and D are defined by multilayer perceptrons, the entire system can be trained with backpropagation. There is no need for any Markov chains or unrolled approximate inference networks during either training or generation of samples. Experiments demonstrate the potential of the framework through qualitative and quantitative evaluation of the generated samples. The neural networks of the embodiments described herein may be further configured as described by Goodfellow et al.

A CGAN included in the embodiments described herein may be configured as described in "Conditional Generative Adversarial Nets," by Mirza et al., arXiv:1411.1784, Nov. 6, 2014, 7 pages, which is incorporated by reference as if fully set forth herein. Generative adversarial nets can be extended to a conditional model if both the generator and discriminator are conditioned on some extra information y. y could be any kind of auxiliary information such as class labels or data from other modalities. Conditioning can be performed by feeding y into both the discriminator and generator as an additional input layer. In the generator, the prior input noise $p_z(z)$, and y are combined in joint hidden representation and the adversarial training framework allows for considerable flexibility in how this hidden representation is composed. In the discriminator x and y are presented as inputs to a discriminative function (embodied in some cases by a multilayer perceptron (MLP)). The objective function of a two-player minimax game would then be:

$$\min_G \max_D V(D, G) = E_{x \sim p_{data}(x)}[\log D(x|y)] + E_{z \sim p_z(z)}[\log(1 - D(G(z|y)))].$$

The neural networks included in the embodiments described herein may be further configured as described in the above incorporated reference by Mirza et al.

A variational auto-encoder is a component that takes the merits of deep learning and variational inference and leads to significant advances in generative modeling. In addition or alternatively, a variational autoencoder (VAE) combined with a GAN or a deep generative adversarial network (DGAN)) may be configured as described in "Adversarial Autoencoders," Makhzani et al., arXiv:1511.05644v2, May 25, 2016, 16 pages, which is incorporated by reference as if fully set forth herein. The embodiments described herein may be further configured as described in this reference.

The neural network is configured for determining inverted features of input images in a training set for a specimen input to the neural network. The inverted features determined by the neural network may include any suitable features described further herein or known in the art that can be inferred from the input and used to generate the output described further herein. For example, the features may include a vector of intensity values per pixel. The features may also include any other types of features described herein, e.g., vectors of scalar values, vectors of independent distributions, joint distributions, or any other suitable feature types known in the art.

As described further herein, the computer subsystem(s) may be configured to acquire the input images in the training set from an imaging subsystem or system described herein and/or from a storage medium in which the images have been stored by an imaging subsystem or system. In addition, in some instances, as described further herein, the computer subsystem(s) may be configured for selecting the input images in the training set (thereby generating the training set of images) from a larger set of images. In some instances, the computer subsystem(s) may also select which imaging parameter(s) are or will be used to generate the input images and/or which input images are selected based on selected imaging parameters. For example, the computer subsystem(s) may select imaging parameters that will be used to collect image data from the imaging subsystem or system, which may include one or more imaging parameters selected from a group of imaging parameters that includes, but is not limited to, illumination band/wavelength, aperture, polarization, pixel size, and other imaging parameters described herein. In addition, the computer subsystem(s) may select any other imaging parameters that affect the input images. A relatively large quantity of images may then be collected under the imaging parameters that are selected on an imaging subsystem or system described herein (e.g., a real tool, a virtual tool, an inspection tool, a review tool, a metrology tool, an optical tool, an electron beam tool, an ion beam tool, etc.). The number of input images in the training set may be any suitable number of input images. In addition, the size of the input images (e.g., in pixels) may be any suitable size.

The training set of input images may also vary depending on the application for which the neural network is being trained. For example, in the deconvolution use case, which is described further herein, a training sample is a single image collected per location, and the training dataset is a collection of training samples. In the phase retrieval use case, which is also described further herein, a training sample is a stack of images collected at various focus offsets per location, and the training dataset is a collection of training samples. In the review use case, the training sample and training dataset may be the same as in the deconvolution use case. In addition, in the tool calibration and optics/mode design use cases, the training sample and training dataset is not defined and is dependent on the targeted use case.

The computer subsystem(s) may also determine where on the specimen that the images are collected from. For example, the computer subsystem(s) may be configured for an optional specimen location sampling step that may be performed using design information for the specimen (e.g., CAD information) and/or hot spot information.

Prior to inputting the input images in the training set into the neural network, the computer subsystem(s) may perform one or more data pre-processing steps on the input images in the training set, which may include any suitable pre-processing steps known in the art.

Each of the layers of the neural network described above may have one or more parameters such as weights, W, and biases, B, whose values can be determined by training the neural network, which may be performed as described further herein. For example, the weights and biases of any layers included in the neural network may be determined during training by minimizing a cost function. The cost function may vary depending on the transformation that is being performed on the images.

The one or more components also include forward physical model 106 shown in FIG. 1 configured for reconstructing the input images from the inverted features thereby generating a set of output images corresponding to the input images in the training set. In this manner, the major functionality of this component is to apply a physical model on the extracted features to regenerate the inputs. For example, as shown in FIG. 2, the system may include forward physical model 206, which may be forward transformation model= f( ). The forward transformation model is applied on inverted features 204 to regenerate model transformed features 208. The forward physical model may be configured as physical simulation layers, which can be derived from differentiable first-principle physics or optics laws (e.g., Maxwell equation, Fourier Optics, etc.).

The forward physical model may also be generated or configured based on information about parameters used for generating the input images and/or runtime images. For example, the forward physical model may be configured based on the physical (optical) conditions that are or will be used to collect image data for the specimen or another specimen, which may include, but are not limited to, optical band/wavelength, optical aperture, polarization, pixel size, etc.

In one embodiment, the forward physical model is configured as a differentiable forward physical model. A physical model can be expressed by certain mathematical functions. In this manner, "differentiable" as used herein means that these mathematical functions are differentiable, i.e., the gradient of these mathematical functions are computable. If the physical model is not differentiable, the model will be approximated by a differentiable model or a linear combination of several differentiable models. The differentiable constraints allow the implementation of the forward physical model via a neural network, and this allows the training of the unified model via stochastic gradient descent or equivalent.

In this manner, the embodiments described herein may be referred to as inversion neural networks (INNs). An "INN" as that term is used herein can be generally defined as a generic and systematic computational framework, which combines a neural network (such as a deep learning neural network) with a forward differentiable first-principle physical model together as a unified trainable model to solve the inverse problem in imaging. In general, as long as a forward differentiable physical model (either exact or approximated) is available, INN can be used as described herein to solve the inverse problem. It is noted that the term "inverse problem" described herein is intended to have the generally accepted definition of that term in that it is called an inverse problem because it starts with the results and then calculates the causes. This is the inverse of a forward problem, which starts with the causes and then calculates the results.

The embodiments described herein, therefore, combine a first-principle imaging/physics model (i.e., the forward physical model) with a neural network (e.g., a machine learning/deep learning model) as a unified trainable model to inverse the imaging effects (e.g., diffraction, interference, partial coherence, etc.) and to identify the signal cause. The INNs described herein only require the forward physical model for forward simulation. In other words, there is no need to solve the inverse problem from first principles. In addition, the configuration of the embodiments described herein enable a computationally efficient approach to extract optical phase information from optical images. Furthermore, the embodiments described herein are capable of learning physically interpretable tool parameters during training.

In another embodiment, the forward physical model is implemented or approximated as an additional neural network. For example, the forward physical model may be implemented via deep learning neural layers, which indeed may form a neural network and perform exact mathematical computation as the original model does. As the original model math is differentiable, its neural network implementation allows back propagation to be applied during training. In this manner, implementing the forward physical model as a neural network means implementing the mathematics of the physical model exactly by a neural network. However, the forward physical model may be approximated as a neural network in situations in which the exact implementation is not possible or the model is not directly differentiable.

In some embodiments, the forward physical model includes model parameters corresponding to imaging parameters used for generating the input images for the specimen. For example, the forward physical model may include, but is not limited to, all possible imaging setup parameters on any of the imaging subsystems described herein (e.g., a wafer inspection tool, a mask tool, etc.).

In a further embodiment, the forward physical model includes model parameters corresponding to physical parameters involved in generating the input images for the specimen. For example, the forward physical model may include, but is not limited to, all possible imaging/physical model parameters from first-principle physics.

In one embodiment, the forward physical model includes at least one adjustable model parameter. For example, depending on the use case, some of the parameters of the forward physical model may be trained as trainable parameters. If any of the parameters are chosen to be trained, their initial values for training can be (a) a random value from a physically valid value range; (b) a hardware crude measurement; (c) a hardware fine calibrated value; or (d) a software fine calibrated value. In one particular example, images may be grabbed from an inspection tool with aperture "A." Aperture "A" is a known tool parameter, and aperture "A" can be used to estimate a crude point spread function (PSF) for the tool. However, the fine (or exact) PSF may be unknown. Therefore, the fine (or exact) PSF can be trainable. In another embodiment, the forward physical model includes at least one fixed model parameter. For example, all or part of the parameters are allowed to be fixed during training if they are representing the hardware specifications or calibrated hardware parameters. Furthermore, the forward physical model may include at least one adjustable model parameter and at least one fixed model parameter. In other words, some of the model parameters of the forward physical model may be fixed and others may be adjustable. In this manner, none, part, or all of the model parameters can be trainable, and none, part, or all of the model parameters can be fixed.

The one or more components further include residue layer 108 shown in FIG. 1 configured for determining differences between the input images in the training set and their corresponding output images in the set. For example, as shown in FIG. 2, the system may include residue layer 210. Input image 200 and model transformed features 208 may be input to the residue layer, which may determine differences between the input images and their corresponding model transformed features, which may be output as residue image 212. In this manner, the residue layer may determine a quality metric. For example, the difference between the original transformed feature(s) and regenerated transformed feature(s) may be computed as the metric for training. In general, the residue layer measures the similarity between the retransformed data (i.e., the output of the forward physical model) and the original data (i.e., the input to the neural network). The possible metrics for the similarity measure include, but are not limited to, various distance measures (e.g., L1, L2, L_inf, Manhattan, etc.), various cross-correlations, mutual information, etc. Unlike the neural network and the forward physical model, the residue layer will in general not have trainable parameters.

The one or more computer subsystems are configured for altering one or more parameters of the neural network based on the determined differences thereby training the neural network. The training objective of the one or more computer subsystems is to minimize the residue layer outputs as small as possible. The parameters of the neural network that are altered by the computer subsystem(s) based on the differences may include any trainable parameters of any of the neural networks described herein (e.g., the trainable parameters of a CNN). In addition, the computer subsystem(s) may be configured to train the neural network in an unsupervised manner; that is, the training requires no labels (nor anything equivalent) for the input images in the training set that are used for training the neural network. The training set of input images may also include a collection of images (optical, electron beam, etc.) with arbitrary size.

The computer subsystem(s) may also be configured for training the neural network and the forward physical model. Such training of both models may be performed simultaneously. At training time, the computer subsystem(s) may use the images collected at the chosen physical condition (used as input to the neural network), which are therefore the input images in the training set, and the physical parameters (used as hyper-parameters (either trainable or fixed)) for the forward physical model.

The neural network described herein may be generated for specific specimens (e.g., specific wafers or reticles), processes, and imaging parameters. In other words, the neural network described herein may be specimen specific, process specific, and imaging parameter specific. For example, in one embodiment, each neural network may be trained to be specific to a particular design and wafer layer. The trained neural network will then only be used to perform predictions for that layer. In this manner, different neural networks may be generated for different wafer layers. However, in another embodiment, a single neural network may be trained with data from different designs and wafer type layers. The resulting neural network may be used to perform predictions in general for all types of the specimens included in the training data. In general, a neural network may be independent of tool as long as the selected imaging modes are repeatable across the tools. For example, tools of the same type may have the same specifications. Therefore, the trained model does not need to be tied to the tool on which the training data was acquired. Each of the different neural networks may be generated with different training sets of data. Each of the different training sets of data may be generated in any suitable manner.

Figure 3:
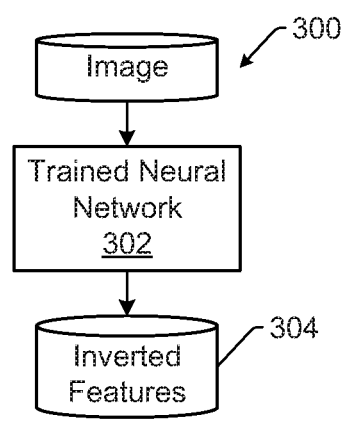
FIGS. 3-4 are flow charts illustrating embodiments of deploying a trained neural network.

The embodiments described herein may also be configured for deployment of the neural network in a variety of ways and for generating a variety of outputs after it has been trained as described further herein. For example, as shown in FIG. 3, in one manner of deployment, trained neural network 302 may be deployed itself (without the forward physical model and without the residue layer). In this manner, during runtime (or deployment), runtime image 300 may be input to trained neural network 302 by the computer subsystem(s) (not shown in FIG. 3, which may be the same computer subsystem(s) that trained the neural network or may be different computer subsystem(s)), which generates inverted features 304, which is the output of the trained neural network. Runtime image 300 may be input to trained neural network 302 along with the imaging parameters (not shown in FIG. 3) that were used to generate the runtime image. Runtime image 300 may also have an arbitrary size. A "runtime" image as that term is used herein simply means a test image that is input to the trained neural network. As such, in one deployment situation, only the first model of the INN (the trained neural network) is deployed, which will generate the inverted features (or the inverted images) alone at prediction time.

Figure 4:
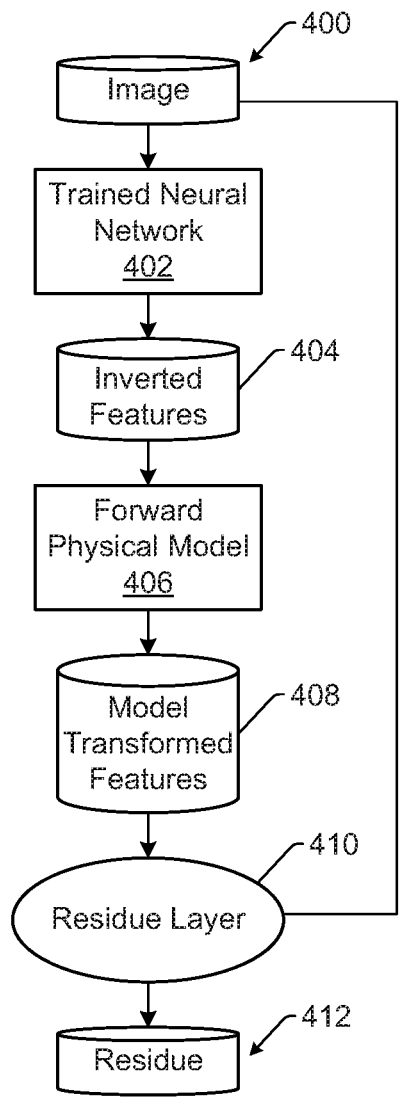

In a different manner of deployment, as shown in FIG. 4, trained neural network 402 may be deployed with forward physical model 406 and residue layer 410. Forward physical model 406 may or may not be trained as described herein. In this manner, runtime image 400 is input to the trained neural network during deployment, which generates inverted features 404. As such, during runtime (or deployment), runtime image 400 may be input to trained neural network 402 by the computer subsystem(s) (not shown in FIG. 4, which may be the same computer subsystem(s) that trained the neural network or may be different computer subsystem(s)), which generates inverted features 404, which is the output of the trained neural network. Runtime image 400 may be input to trained neural network 402 along with the imaging parameters (not shown in FIG. 4) that were used to generate the runtime image. Runtime image 400 may also have an arbitrary size. Inverted features 404 may be input to forward physical model 406, which generates model transformed features 408. The model transformed features may then be input to residue layer 410 in combination with image 400, which may use those inputs to generate residue image 412.

As such, in another deployment situation, the entire INN (the trained neural network, the forward physical model (trained or not), and the residue layer) is deployed, which will generate both the inverted features (or inverted images) and the residue images. In this manner, the inverted features/images are the desired result from the INN, the "model transformed" is the intermediate data that describes how well the INN performs, and the "residue image" is a quantitative measure of performance or "wellness" of INN. For example, the "residue" images are expected to be close to zero-valued at each pixel. The pixel values in the residue image can therefore be used to identify any catastrophic failure of the INN model. That is, if the "residue" images have relatively large values at certain pixels, that is an indication that the INN model performs poorly on generating the inverted images. Therefore, the generated inverted images can be filtered for these locations.

The embodiments described herein may be configured for performing a number of different types of transformations (i.e., transforming the input image to the inverted features). For example, the inverted image/features may be different things for different use cases because the physical model is different for each use case. In other words, the configuration of the neural network will depend on the forward physical model that is used during training. For example, in one embodiment, the one or more computer subsystems are configured to input a runtime image for the specimen or another specimen into the trained neural network such that the trained neural network determines the inverted features for the runtime image, and the inverted features are features of an optically corrected version of the runtime image. Such a configuration may therefore perform deconvolution of the input image. In this manner, the inverted features may be the desired sharp image (for deconvolution). Although the term "optically corrected" is used herein, an "optically corrected" version may be corrected for optical and other types (e.g., electron beam and ion beam) of imaging effects. In other words, the "optically corrected" version of the runtime image is not limited to just light-based imaging corrections of the input image.

The optically corrected version of the runtime image may be corrected in a number of different ways. For example, the runtime image may be optically corrected for blur, contrast, color, noise, and other adverse imaging effects caused by the imaging subsystem or system that generated the runtime image from the specimen or caused by the specimen itself (or one or more processes performed on the specimen). In one such example, the runtime image may be a blurred imaged that is input to the trained neural network, which produces inverted features/images, i.e., a sharp image, for the blurred image. In this manner, in the deconvolution case, the inverted features/image is a sharp image, which is generated by removing blur from the runtime image. If the INN is deployed with the forward physical model and the residue layer, the forward physical model (an optical model in this case) may be an optical blurring model given wavelength, PSF, etc. The forward physical model generates model transformed features/images, i.e., a simulated blurred image based on the generated "sharp" image. The residue layer may then subtract the simulated blurred image from the runtime image (or vice versa) to generate a residue image.

The optically corrected version of the image may also be corrected for resolution problems and/or to improve the resolution of the runtime image. For example, in some embodiments, the neural network may be configured to generate one or more high resolution images from a low resolution input image. Therefore, the embodiments described herein may be configured for deconvolution for the purpose of enhancing resolution, which can thereby improve defect signal-to-noise (SNR) ratio for applications such as inspection, metrology, and review. In addition, the embodiments described herein may be configured for electron beam and/or ion beam deconvolution for the purpose of enhancing electron beam and/or ion beam resolution, which can thereby improve defect SNR ratio for applications such as inspection, metrology, and review. In this manner, the optically corrected versions of the runtime images may include more specific information for the specimen, which can then be used for defect detection, classification, review, etc.

In an additional embodiment, the one or more computer subsystems are configured to input a runtime image for the specimen or another specimen into the trained neural network such that: the trained neural network determines the inverted features for the runtime image; the forward physical model reconstructs the runtime image from the inverted features determined for the runtime image; and the residue layer determines differences between the runtime image and the reconstructed runtime image, where the inverted features are features of an optically corrected version of the runtime image, and the differences between the runtime image and the reconstructed runtime image are features of a residue image. In one embodiment, therefore, the raw runtime images may be collected from an imaging subsystem or system under the same imaging conditions as in training. Then, the raw runtime images may be input to the trained INN model to generate the deconvolved image (i.e., the "inverted" image) and a residue image. The deconvolved image may be a sharper image than the raw image, and it may have a higher resolution thereby improving the SNR for defect detection. The residue image can be used for identifying catastrophic failure of the INN model as described further herein.

The term "low resolution image" of a specimen, as used herein, is generally defined as an image in which all of the patterned features formed in the area of the specimen at which the image was generated are not resolved in the image. For example, some of the patterned features in the area of the specimen at which a low resolution image was generated may be resolved in the low resolution image if their size is large enough to render them resolvable. However, the low resolution image is not generated at a resolution that renders all patterned features in the image resolvable. In this manner, a "low resolution image," as that term is used herein, does not contain information about patterned features on the specimen that is sufficient for the low resolution image to be used for applications such as defect review, which may include defect classification and/or verification, and metrology. In addition, a "low resolution image" as that term is used herein generally refers to images generated by inspection systems, which typically have relatively lower resolution (e.g., lower than defect review and/or metrology systems) in order to have relatively fast throughput.

The "low resolution images" may also be "low resolution" in that they have a lower resolution than a "high resolution image" described herein. A "high resolution image" as that term is used herein can be generally defined as an image in which all patterned features of the specimen are resolved with relatively high accuracy. In this manner, all of the patterned features in the area of the specimen for which a high resolution image is generated are resolved in the high resolution image regardless of their size. As such, a "high resolution image," as that term is used herein, contains information about patterned features of the specimen that is sufficient for the high resolution image to be used for applications such as defect review, which may include defect classification and/or verification, and metrology. In addition, a "high resolution image" as that term is used herein generally refers to images that cannot be generated by inspection systems during routine operation, which are configured to sacrifice resolution capability for increased throughput.

In another embodiment, the one or more computer subsystems are configured to input a runtime image for the specimen or another specimen into the trained neural network such that the trained neural network determines the inverted features for the runtime image, and the inverted features are features of an amplitude and phase version of the runtime image. For example, the runtime image may be an intensity image that is input to the trained neural network, which may in this configuration generate inverted features/images, i.e., amplitude and phase images (for phase retrieval). If the deployed INN includes the forward physical model and the residue layer, then the forward physical model (e.g., an optical model), i.e., an image formation model given wavelength, PSF, amplitude transfer function (ATM), etc. may generate model transformed features/images, i.e., a simulated intensity image based on an optical model given the generated "amplitude" and "phase" images. The residue layer may subtract the inverted features/images from the model transformed features/images (or vice versa) thereby generating a residue image.

The embodiments described herein are therefore fundamentally different than currently used methods and systems since the embodiments described herein combine a neural network (e.g., machine learning, deep learning, etc.) with imaging simulation (i.e., the forward physical model). In addition, the embodiments described herein were created by finding a breakthrough point on how to combine the neural network and physical model for inverse problem (not every problem) and establishing a systematic way to solve and implement it. In contrast, deep learning is widely adopted by the industry especially for image classification and language processing. Until now, the majority of applications and research treat deep learning/machine learning as a black box. In addition, until now, there is no explicit way to combine deep learning (e.g., a neural network) with a physical model, nor to use a physical model to guide the learning of a neural network.

For the computer science and image processing community, the inverse problem (i.e., deconvolution) is often solved via a supervised manner if a training based approach has to be used. These applications are mainly focused on natural images, which do not have strong imaging effects (like scattering, interference, etc.). Therefore, it is affordable to learn a model without the guidance of a physical/imaging model. However, for applications (e.g., a wafer at nanoscale) which have to consider strong physics/imaging interaction, the naïve (brute force) training approach often leads to substantially poor generalization performance for unseen data (due to overfitting).

In the past decades, many in the physics, chemistry, and computer science fields have undertaken significant efforts to explore whether machine learning (e.g., kernel-based approach) methods can be used to train models for learning complicated physics models (e.g., prediction energy). In general, the idea is to use machine learning to replace conventional analytical methods instead of combining them. In general, there is not much breakthrough due to the poor accuracy of trained models. Even though deep learning is getting popular in the last three years, the major efforts in the science community are still either to use it as a black box or to treat it as an alternative to analytical physical models.

The embodiments described herein have, therefore, a number of advantages over other currently used methods and systems. For example, the embodiments described herein combine a neural network (e.g., machine learning, deep learning, etc.) with imaging simulation (i.e., the forward physical model). In this manner, the embodiments described herein enable solving the imaging inverse problem, which is often impossible or extremely slow via either first-principle optics or conventional optimization methods (e.g., deconvolution). The embodiments described herein also do not have the under-determined problems of currently used deconvolution methods and systems because the embodiments described herein mathematically learn how to perform the deconvolution transformation via a neural network (which is well-constrained given a relatively large number of training dataset is used), instead of optimizing the "deconvolved output" as in currently used methods. In addition, the embodiments described herein do not have the under-determined problems of currently used deconvolution methods and systems since the mathematical formula or neural network topology adds constraints to the learning of the inversion process. The embodiments described herein further do not have the under-determined problems of currently used deconvolution methods and systems because the forward physical model adds the constraints from the first-principle to learning of the inversion process. Furthermore, these constraints help to improve the generalization and prevent overfitting. In addition, the imaging layer(s) (i.e., the forward physical model) based on first-principle imaging tremendously reduces the number of model parameters, e.g., compared to the general purpose machine learning/deep learning models. Furthermore, the embodiments described herein make it possible to combine imaging tool design with an INN to improve imaging resolution via deconvolution.

The embodiments described herein are also configured as a unified model. In this manner, instead of a two-step approach, the INN is a unified model for training and prediction. The embodiments described herein are also capable of learning complex imaging effects and interpreting them from first-principle imaging. This method is capable of learning complex and diverse imaging effects (diffraction, interference, partial coherence, etc.). In addition, unlike general machine learning models, the tool parameters learned in the INN have explicit physical meanings, which can help to understand and to guide the model design.

The embodiments described herein further require no labeling and have a relatively fast setup time. For example, as described further herein, the training of the INN is unsupervised. The embodiments described herein also are configured for relatively fast training time and relatively fast runtime. For example, fewer numbers of parameters and the forward physical model makes training faster than general-purpose machine learning/deep learning models. In addition, the embodiments described herein provide faster speed in production runtime (i.e., can do relatively quick prediction). Furthermore, the embodiments described herein enable real time processing on tool. Real time processing in the context of the embodiments described herein refers to the processing time of an algorithm with fixed computation hardware that is equal to or faster than the data collection time of the hardware. Therefore, the hardware can run at the maximum throughput. For example, if collecting an image from an inspection tool takes about 1 ms, the algorithm can run at least in 1 ms. In this manner, the prediction time of the INN is fast enough to keep up with the data collection speed of the imaging subsystem or system (hardware). In currently used methods, the ones which can provide decent results often require iterative non-linear optimization, which is orders of magnitude slower than the "real time" requirement.

The embodiments described herein may be configured to perform a number of different functions using the inverted image, possibly in combination with the runtime image. Each of these functions may be performed as described further herein.

In one embodiment, the one or more computer subsystems are configured to input a runtime image for the specimen or another specimen into the trained neural network such that the trained neural network determines the inverted features for the runtime image, the inverted features are features of an optically corrected version of the runtime image, the one or more computer subsystems are configured for classifying a defect detected in the runtime image or the optically corrected version of the runtime image, and the classifying is performed based on the optically corrected version of the runtime image. For example, the runtime image may be an optical image of a specimen or the other specimen and the optically corrected version of the runtime image may include a higher resolution image of the specimen or the other specimen such as an image that may be generated by an electron beam imaging subsystem and/or an image of design data or design information for the specimen or the other specimen.

One benefit of optical image to SEM and/or design transformations is that optical inspection is still the key for high volume production yield in semiconductor manufacturing processes. Due to lack of resolution, defects detected by optical inspectors require SEM review for defect classification. Methods that automatically transform optical to SEM and/or design can potentially reduce SEM review requirements for yield management, thereby reducing total inspection cycle time. For example, the embodiments described herein can eliminate the need for acquiring SEM images on a defect review system after specimen inspection since the optically corrected version of the runtime image described herein can be 1) acquired without the specimen or the other specimen and without imaging hardware and 2) used for defect review applications such as defect classification.

The defect that is classified by the one or more computer subsystems may be detected in the runtime image and/or the optically corrected version of the runtime image as described herein. In addition, classifying the defect based on the optically corrected version of the runtime image may be performed in any suitable manner known in the art. For example, the optically corrected version of the runtime image may be used as input to any suitable defect classification methods and/or algorithms known in the art. In other words, the optically corrected version of the runtime image may be used as any other images for defect classification. Results of the defect classification performed by the embodiments described herein may have any suitable format (e.g., defect classification codes, etc.).

In a further embodiment, the one or more computer subsystems are configured to input a runtime image for the specimen or another specimen into the trained neural network such that the trained neural network determines the inverted features for the runtime image, the inverted features are features of an optically corrected version of the runtime image, and the one or more computer subsystems are configured for detecting a defect on the specimen or the other specimen based on the optically corrected version of the runtime image. The computer subsystem(s) may be configured to use the optically corrected version of the runtime image to detect defects on the specimen or the other specimen in any suitable manner. For example, the computer subsystem(s) may be configured to apply one or more defect detection algorithms and/or methods to the optically corrected version of the runtime image, which may include any suitable defect detection algorithms and/or methods known in the art. In one such example, the computer subsystem(s) may be configured to compare the optically corrected version of the runtime image to a reference for the specimen or the other specimen and then apply a threshold to results of the comparison. Pixels in the optically corrected version of the runtime image having results of the comparison above the threshold may be identified as defects while pixels in the optically corrected version of the runtime image having results of the comparison below the threshold may not be identified as defects.

In another example, the computer subsystem(s) may be configured for single image detection as described in U.S. patent application Ser. No. 15/353,210 filed Nov. 16, 2016 by Karsenti et al., which is incorporated by reference as if fully set forth herein. In one such embodiment, the inverted features determined for the input image by the neural network may be used, as described in this patent application, to detect defects in the optically corrected version of the runtime image. For example, the computer subsystem(s) may be configured for selecting labels for pixels or blocks of pixels in the input image based on (1) the inverted features and (2) mapping of the pixels or blocks of the pixels of an inverted feature map volume into the labels. The computer subsystems may be further configured for detecting defects on the specimen or the other specimen based on the selected labels for the pixels or blocks.

In addition, the computer subsystem(s) may be configured to detect defects on the specimen or the other specimen using the runtime image in combination with the optically corrected version of the runtime image. For example, if the runtime image is a low resolution image and the optically corrected version of the runtime image includes a high resolution image, a position of a defect detected in the low resolution image may be identified in the high resolution image to determine the design context of the defect, which can then be used to determine if the defect is a nuisance defect or an actual defect. In addition, a position of a defect detected in the low resolution image may be used to identify the position of the defect in the high resolution image to determine if the defect is present (can be detected) in the high resolution image. If the defect can be detected in the high resolution image, it is designated as an actual defect. If the defect cannot be detected in the high resolution image, it is designated as a nuisance defect.

In an additional embodiment, the one or more computer subsystems are configured to input a runtime image for the specimen or another specimen into the trained neural network such that the trained neural network determines the inverted features for the runtime image, the inverted features are features of an optically corrected version of the runtime image, and the one or more computer subsystems are configured for measuring one or more features of the specimen or the other specimen or a defect detected on the specimen or the other specimen based on the optically corrected version of the runtime image. For example, the neural network may be configured such that the optically corrected version of the runtime image generated by the neural network is a high resolution image generated from a runtime image that is a low resolution image. The optically corrected version of the runtime image may therefore contain greater detail about features formed on the specimen or the other specimen (e.g., patterned features such as lines, spaces, contacts, etc. as well as defects on the specimen or the other specimen) than the runtime image. The computer subsystem(s) may then use the optically corrected version of the runtime image to measure or determine one or more characteristics of the features on the specimen or the other specimen.

The one or more characteristics of the features may be determined in any suitable manner. In addition, the one or more characteristics of the features that are determined or measured by the computer subsystem(s) may include any suitable characteristics such as dimension (e.g., line width, contact diameter, etc.), shape, relative location, etc. The measurements may be performed on the optically corrected version of the runtime image by the computer subsystem(s) as described in U.S. Patent Application Publication Nos. 2016/0116420 published on Apr. 28, 2016 by Duffy et al., 2016/0372303 published on Dec. 22, 2016 by Park et al., and 2016/0377425 published on Dec. 29, 2016 by Gupta et al., which are incorporated by reference as if fully set forth herein. The embodiments described herein may be further configured as described in these publications.

In some embodiments, the one or more computer subsystems are configured to input a stack of runtime images for the specimen or another specimen into the trained neural network such that the trained neural network determines the inverted features for the stack of runtime images, the inverted features are phase information for the stack of runtime images, and the one or more computer subsystems are configured for increasing selectivity for defects on the specimen or the other specimen based on the phase information. For example, the embodiments described herein can be performed for optical phase retrieval to generate phase information from a stack of optical images, which can be used to increase defect selectivity. In particular, in the optical phase retrieval use case, the INN generates an inverted image that is an amplitude and phase image, which contains phase information that can be used to help on SNR, detection, etc. Increasing the selectivity for defects based on the phase information may be performed in any suitable manner known in the art.

In one embodiment, the one or more computer subsystems are configured for determining one or more adjustments for one or more parameters used for generating the input images based on results of the training. For example, the embodiments described herein may be configured for substantially accurate tool calibration. In other words, better tool parameters can be optimized out from the crude measured initial tool parameters during training of the INN, and the optimized parameters are better calibration values. In one particular example, images may be grabbed from an inspection tool with aperture "A." Aperture "A" is a known tool parameter, and aperture "A" can be used to estimate a crude PSF for the tool. However, the fine (or exact) PSF is unknown. Therefore, the fine (or exact) PSF can be trainable. The tool calibration for PSF can then be performed based on these results. For example, the crude PSF is used as the initial value for training. After training is done, the optimized PSF is considered as the fine calibrated PSF.

The embodiments described herein may be further configured for performing other transformations (from an input image to a simulated image) such as those described in commonly owned U.S. patent application Ser. No. 15/176,139 filed Jun. 7, 2016 by Zhang et al., Ser. No. 15/353,210 filed Nov. 16, 2016 by Karsenti et al., Ser. No. 15/394,790 filed Dec. 29, 2016 by Bhaskar et al., Ser. No. 15/394,792 filed Dec. 29, 2016 by Bhaskar et al., Ser. No. 15/396,800 filed Jan. 2, 2017 by Zhang et al., Ser. No. 15/402,094 filed Jan. 9, 2017 by Bhaskar et al., Ser. No. 15/402,169 filed Jan. 9, 2017 by Bhaskar et al., Ser. No. 15/402,197 filed Jan. 9, 2017 by Park et al., and Ser. No. 15/603,249 filed May 23, 2017 by Zhang et al., which are incorporated by reference as if fully set forth herein. The embodiments described herein may be further configured as described in these patent applications. In addition, the embodiments described herein may be configured to perform any steps described in these patent applications.

Another embodiment of a system configured to train a neural network includes an imaging subsystem configured for generating images of a specimen. The imaging subsystem may have any configuration described herein. The system also includes one or more computer subsystems, e.g., computer subsystem(s) 102 shown in FIG. 1, configured for acquiring the images and generating a training set of input images from the acquired images. The computer subsystem(s) may be configured as described further herein. The system also includes one or more components, e.g., component(s) 100, executed by the one or more computer subsystems, which may include any of the component(s) described herein. The component(s) include neural network 104, forward physical model 106, and residue layer 108, each of which may be configured as described herein. For example, the neural network is configured for determining inverted features of the input images in the training set for the specimen input to the neural network. The forward physical model is configured for reconstructing the input images from the inverted features thereby generating a set of output images corresponding to the input images in the training set. The residue layer is configured for determining differences between the input images in the training set and their corresponding output images in the set. The computer subsystem(s) are also configured for altering one or more parameters of the neural network based on the determined differences thereby training the neural network. This system embodiment may be further configured as described herein.

Each of the embodiments of each of the systems described above may be combined together into one single embodiment.

Another embodiment relates to a computer-implemented method for training a neural network. The method includes determining inverted features of input images in a training set for a specimen by inputting the training set of input images to a neural network. The method also includes reconstructing the input images from the inverted features by inputting the inverted features into a forward physical model thereby generating a set of output images corresponding to the input images in the training set. In addition, the method includes determining differences between the input images in the training set and their corresponding output images in the set. The method further includes determining one or more parameters of the neural network based on the determined differences thereby training the neural network. Determining the inverted features, reconstructing the input images, determining the differences, and altering the one or more parameters are performed by one or more computer systems. One or more components are executed by the one or more computer systems, and the one or more components include the neural network and the forward physical model.

Each of the steps of the method may be performed as described further herein. The method may also include any other step(s) that can be performed by the system, computer subsystem(s), and/or imaging systems or subsystems described herein. The one or more computer systems, the one or more components, the neural network, and the forward physical model may be configured according to any of the embodiments described herein, e.g., computer subsystem(s) 102, component(s) 100, neural network 104, and forward physical model 106. In addition, the method described above may be performed by any of the system embodiments described herein.

Figure 5:
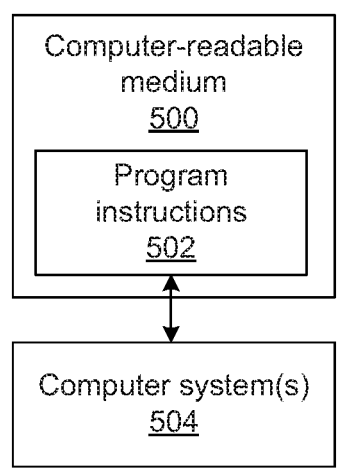
FIG. 5 is a block diagram illustrating one embodiment of a non-transitory computer-readable medium storing program instructions for causing one or more computer systems to perform a computer-implemented method described herein.

An additional embodiment relates to a non-transitory computer-readable medium storing program instructions executable on one or more computer systems for performing a computer-implemented method for training a neural network. One such embodiment is shown in FIG. 5. In particular, as shown in FIG. 5, non-transitory computer-readable medium 500 includes program instructions 502 executable on computer system(s) 504. The computer-implemented method may include any step(s) of any method(s) described herein.

Program instructions 502 implementing methods such as those described herein may be stored on computer-readable medium 500. The computer-readable medium may be a storage medium such as a magnetic or optical disk, a magnetic tape, or any other suitable non-transitory computer-readable medium known in the art.

The program instructions may be implemented in any of various ways, including procedure-based techniques, component-based techniques, and/or object-oriented techniques, among others. For example, the program instructions may be implemented using ActiveX controls, C++ objects, JavaBeans, Microsoft Foundation Classes ("MFC"), SSE (Streaming SIMD Extension) or other technologies or methodologies, as desired.

Computer system(s) 504 may be configured according to any of the embodiments described herein.

Further modifications and alternative embodiments of various aspects of the invention will be apparent to those skilled in the art in view of this description. For example, methods and systems for training a neural network are provided. Accordingly, this description is to be construed as illustrative only and is for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

What is claimed is:

1. A system configured to train a neural network, comprising:
    one or more computer subsystems; and
    one or more components executed by the one or more computer subsystems, wherein the one or more components comprise:
        a neural network configured for determining inverted features of input images in a training set for a specimen input to the neural network;
        a forward physical model configured for reconstructing the input images from the inverted features thereby generating a set of output images corresponding to the input images in the training set; and
        a residue layer configured for determining differences between the input images in the training set and their corresponding output images in the set;
    wherein the one or more computer subsystems are configured for altering one or more parameters of the neural network based on the determined differences thereby training the neural network,
    wherein the one or more computer subsystems are further configured to input a runtime image for the specimen or another specimen into the trained neural network such that the trained neural network determines the inverted features for the runtime image, and wherein the inverted features are features of an optically corrected version of the runtime image.

2. The system of claim 1, wherein the neural network is configured as a convolutional neural network.

3. The system of claim 1, wherein the neural network is configured as a fully convolutional model.

4. The system of claim 1, wherein the neural network is configured as a deep generative model.

5. The system of claim 1, wherein the neural network is configured as a generative adversarial net.

6. The system of claim 1, wherein the neural network is configured as a conditional generative adversarial net.

7. The system of claim 1, wherein the neural network is configured as a generative adversarial network and variational autoencoder.

8. The system of claim 1, wherein a part of the neural network is configured as a convolutional neural network.

9. The system of claim 1, wherein the forward physical model is configured as a differentiable forward physical model.

10. The system of claim 1, wherein the forward physical model is implemented or approximated as an additional neural network.

11. The system of claim 1, wherein the forward physical model comprises model parameters corresponding to imaging parameters used for generating the input images for the specimen.

12. The system of claim 1, wherein the forward physical model comprises model parameters corresponding to physical parameters involved in generating the input images for the specimen.

13. The system of claim 1, wherein the forward physical model comprises at least one adjustable model parameter.

14. The system of claim 1, wherein the forward physical model comprises at least one fixed model parameter.

15. The system of claim 1, wherein the one or more computer subsystems are further configured to input the runtime image for the specimen or the other specimen into the trained neural network such that:
    the trained neural network determines the inverted features for the runtime image;
    the forward physical model reconstructs the runtime image from the inverted features determined for the runtime image; and
    the residue layer determines differences between the runtime image and the reconstructed runtime image, wherein the differences between the runtime image and the reconstructed runtime image are features of a residue image.

16. The system of claim 1, wherein the input images are generated by an electron beam based imaging system.

17. The system of claim 1, wherein the input images are generated by an optical based imaging system.

18. The system of claim 1, wherein the input images are generated by an inspection system.

19. The system of claim 1, wherein the input images are generated by a metrology system.

20. The system of claim 1, wherein the specimen is a wafer.

21. The system of claim 1, wherein the specimen is a reticle.

22. The system of claim 1, wherein the one or more computer subsystems are further configured for detecting a defect on the specimen or the other specimen based on the optically corrected version of the runtime image.

23. The system of claim 1, wherein the one or more computer subsystems are further configured for classifying a defect detected in the runtime image or the optically corrected version of the runtime image, and wherein said classifying is performed based on the optically corrected version of the runtime image.

24. The system of claim 1, wherein the one or more computer subsystems are further configured for measuring one or more features of the specimen or the other specimen or a defect detected on the specimen or the other specimen based on the optically corrected version of the runtime image.

25. The system of claim 1, wherein the one or more computer subsystems are further configured to input a stack of runtime images for the specimen or the other specimen into the trained neural network such that the trained neural network determines the inverted features for the stack of runtime images, wherein the inverted features for the stack of runtime images are phase information for the stack of runtime images, and wherein the one or more computer subsystems are further configured for increasing selectivity for defects on the specimen or the other specimen based on the phase information.

26. The system of claim 1, wherein the one or more computer subsystems are further configured for determining one or more adjustments for one or more parameters used for generating the input images based on results of the training.

27. A system configured to train a neural network, comprising:

an imaging subsystem configured for generating images of a specimen;

one or more computer subsystems configured for acquiring the images and generating a training set of input images from the acquired images; and one or more components executed by the one or more computer subsystems, wherein the one or more components comprise:

a neural network configured for determining inverted features of the input images in the training set for the specimen input to the neural network;

a forward physical model configured for reconstructing the input images from the inverted features thereby generating a set of output images corresponding to the input images in the training set; and a residue layer configured for determining differences between the input images in the training set and their corresponding output images in the set;

wherein the one or more computer subsystems are configured for altering one or more parameters of the neural network based on the determined differences thereby training the neural network, wherein the one or more computer subsystems are further configured to input a runtime image for the specimen or another specimen into the trained neural network such that the trained neural network determines the inverted features for the runtime image, and wherein the inverted features are features of an optically corrected version of the runtime image.

28. A non-transitory computer-readable medium, storing program instructions executable on one or more computer systems for performing a computer-implemented method for training a neural network, wherein the computer-implemented method comprises:

determining inverted features of input images in a training set for a specimen by inputting the training set of input images to a neural network;

reconstructing the input images from the inverted features by inputting the inverted features into a forward physical model thereby generating a set of output images corresponding to the input images in the training set;

determining differences between the input images in the training set and their corresponding output images in the set;

altering one or more parameters of the neural network based on the determined differences thereby training the neural network; and inputting a runtime image for the specimen or another specimen into the trained neural network such that the trained neural network determines the inverted features for the runtime image, wherein the inverted features are features of an optically corrected version of the runtime image, wherein said determining the inverted features, reconstructing the input images, determining the differences, altering the one or more parameters, and inputting the runtime image are performed by one or more computer systems, wherein one or more components are executed by the one or more computer systems, and wherein the one or more components comprise the neural network and the forward physical model.

29. A computer-implemented method for training a neural network, comprising:

determining inverted features of input images in a training set for a specimen by inputting the training set of input images to a neural network;

reconstructing the input images from the inverted features by inputting the inverted features into a forward physical model thereby generating a set of output images corresponding to the input images in the training set;

determining differences between the input images in the training set and their corresponding output images in the set;

altering one or more parameters of the neural network based on the determined differences thereby training the neural network; and inputting a runtime image for the specimen or another specimen into the trained neural network such that the trained neural network determines the inverted features for the runtime image, wherein the inverted features are features of an optically corrected version of the runtime image, wherein said determining the inverted features, reconstructing the input images, determining the differences, altering the one or more parameters, and inputting the runtime image are performed by one or more computer systems, wherein one or more components are executed by the one or more computer systems, and wherein the one or more components comprise the neural network and the forward physical model.

30. A system configured to train a neural network, comprising:

one or more computer subsystems; and one or more components executed by the one or more computer subsystems, wherein the one or more components comprise:

a neural network configured for determining inverted features of input images in a training set for a specimen input to the neural network;

a forward physical model configured for reconstructing the input images from the inverted features thereby generating a set of output images corresponding to the input images in the training set; and a residue layer configured for determining differences between the input images in the training set and their corresponding output images in the set;

wherein the one or more computer subsystems are configured for altering one or more parameters of the neural network based on the determined differences thereby training the neural network, wherein the one or more computer subsystems are further configured to input a runtime image for the specimen or another specimen into the trained neural network such that the trained neural network determines the inverted features for the runtime image, and wherein the inverted features are features of an amplitude and phase version of the runtime image.

* * * * *